UNITED STATES PATENT OFFICE

RUDOLF ADLER, OF KARLSBAD, CZECHOSLOVAKIA

PROCESS FOR PURIFYING AND STERILIZING WATER

No Drawing. Application filed February 7, 1930, Serial No. 426,774, and in the Netherlands March 28, 1929.

This invention relates to a process for purifying and sterilizing water.

In order to destroy as far as possible, the dissolved organic substances present in water and in particular to kill all germs, it has already been proposed to add to the water a relatively large quantity of chlorin and to remove the excess of free chlorin remaining after a certain time by means of carbonaceous substances.

However, in carrying out such processes, certain disadvantages occur which prevent their introduction into practical use for water treatment.

Namely, it was found that even upon the addition of large quantities of chlorin to the raw water, germs appear after a short time in the pure water. This appearance of germs in the pure water, as tests have shown, depends on the fact that carbonaceous substances, absorb germs, and as the carbon surfaces afford favorable fields of the growth of collected germs which per chance have evaded the action of the chlorin, at any zone of the carbon in which the freed chlorin has already been removed from the water, these germs will continually infect the water flowing through the carbon.

The object of this invention is a process in which in known manner an excess of free or active chlorin is employed and wherein a carbonaceous material is used for the dechlorinating process substance but in which the described disadvantages are wholly avoided.

The complete conversion of the chlorin passing over the surface of the carbon, into the chlorin ion takes place when a definite relation is maintained between the quantity of carbon and the linear velocity of flow of the water.

The course of the reaction of this conversion proceeds in accordance with the law of mass-action, namely in accordance with the course of a mono-molecular reaction, so that a decrease of concentration is produced, whereby, at a zone of the carbon relatively remote from the chlorin supply, such a slight concentration of chlorin is provided that in case germs are located in this zone which is poor in chlorin (or already entirely free from chlorin), these germs will develop and multiply.

It has now been found that this disadvantage may be remedied if all parts of the carbon are periodically permeated with water having a bactericidal chlorin content and thereby any germs present are killed, thus avoiding any re-infection of the water.

It has also been found that this periodical flushing of chlorin-containing water through all parts of the carbon is attained if the period of flow of the chlorin-containing water through the carbon is shortened, so that the decrease in concentration of the free chlorin within a given layer of carbon does not fall below the bactericidal chlorin concentration.

This is attained by periodically decreasing the time of flowing-through necessary for the quantitative conversion of the chlorin into the chlorin ion, or by causing the supplying of the chlorin-containing water to take place alternately in such way that all parts of the carbon are permeated one after another by chlorin-containing water or by periodically adding a substance of alkaline reaction to the water, during a short interruption of the operation.

In all cases a periodic sterilizing of the carbon by means of chlorin is attained.

I claim:

1. Process for periodically purifying carbon serving the purpose of changing the chlorine, which has been utilized in sterilizing water, into chlorine ions, which comprises periodically adding a soluble alkali reacting substance to the chlorine containing water before it passes through the carbon.

2. A process for periodically sterilizing the carbon used in the removal of chlorin from water sterilized thereby, said process comprising periodically causing the minimum concentration of the free chlorin in the water passing through said carbon to increase to such an extent as to be bactericidal, and periodically adding an alkali to the chlorin-containing water to obtain the desired increase of minimum chlorin concentration.

In testimony whereof I affix my signature.

RUDOLF ADLER.